March 23, 1965 R. BAYER ETAL 3,175,045

LOUDSPEAKING INTERCOMMUNICATION SYSTEM

Filed Aug. 22, 1961

3 Sheets-Sheet 1

Inventors
R. BAYER
G. BESZEDICS

By Paul W. Hemminger
Attorney

Inventors
R. BAYER
G. BESZEDICS

By Paul W. Hemminger
Attorney

LOUDSPEAKING INTERCOMMUNICATION SYSTEM

Filed Aug. 22, 1961 3 Sheets-Sheet 3

*Inventor*
R. BAYER
G. BESZEDICS
By Paul W. Hemminger
*Attorney*

United States Patent Office 3,175,045

Patented Mar. 23, 1965

3,175,045

LOUDSPEAKING INTERCOMMUNICATION SYSTEM

Rudolf Bayer and Geza Beszedics, Vienna, Austria, assignors to International Standard Electric Corporation, New York, N.Y., a corporation of Delaware Filed Aug. 22, 1961, Ser. No. 133,158
Claims priority, application Austria, Sept. 2, 1960, A 6,744/60
4 Claims. (Cl. 179—37)

This invention relates in general to a loudspeaking intercommunication system, and in particular to a loudspeaking intercommunication system in which all stations are of equal authorization and in which the signalling of a called station is accomplished by speaking the desired party's name or station code. Its principal object is to provide a circuit arrangement for an intercommunication system of the above character which is simple in construction yet provides the advantages of the more expensive systems.

This invention is an improvement on the simple and economical intercommunication system of the type wherein each station is connected in receiving condition with every other station of the system. Thus, when any station calls any other station all stations in the system hear the calling information. Such systems are obviously undesirable since the unwanted stations are alerted and the subscriber at each station must ascertain if the call is for that station. Such systems, however, have found a general acceptance since the initial cost is at a minimum. Accordingly, an object of the present invention is to retain the low cost of such systems yet overcome the undesirable characteristic of all stations being signalled when any call is originated. Further, these known systems have the additional disadvantage that the conversation is overheard by all stations since they are necessarily metallically interconnected in order to receive the sigalling information. Accordingly, another object is to provide a low cost loudspeaking intercommunication system which provides secrecy of conversation.

In carrying out the above objects, uni-directional devices of a predetermined polarity and bias are provided which renders the above economical system fully selective as to calling signals, and provides the noted secrecy of conversation.

A related feature is concerned with the biasing arrangement for the noted uni-directional devices, which biasing arrangement is so dimensioned that it will have no adverse effect on the voice signals yet satisfactorily eliminate cross-talk interference.

A further feature is concerned with a circuit arrangement for blocking direct-current biasing to isolate the conversation circuit of all stations therefrom.

Other objects and features of the invention will become apparent and the invention will be best understood by reading the specification in conjunction with the accompanying drawings comprising FIGS. 1 to 4 in which FIG. 1 shows a schematic representation of a prior-art system;

Figure 1:
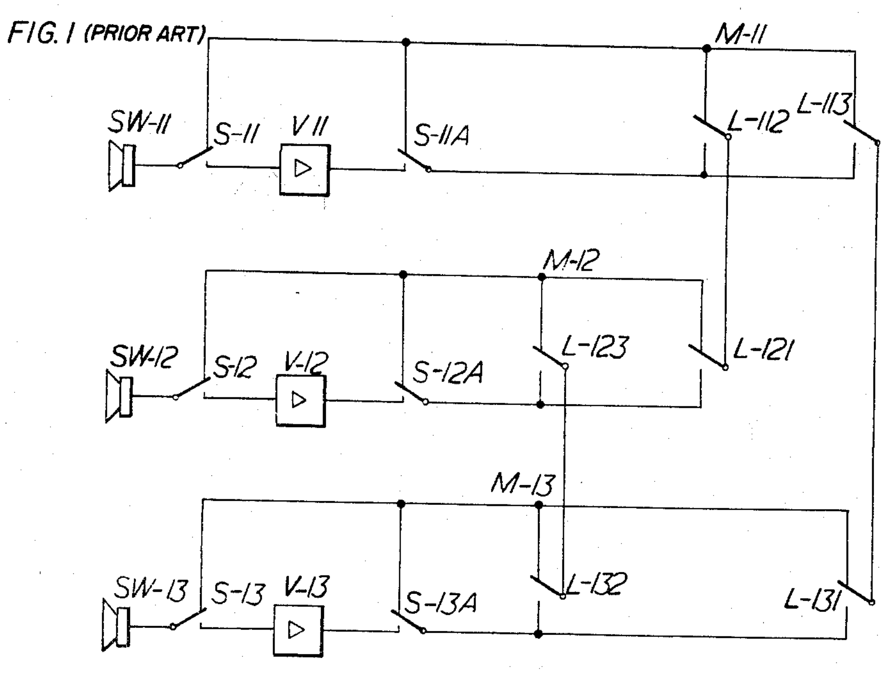
FIG. 1 (PRIOR ART)

Referring now to the drawings, the diagrams shown therein are single wire diagrams in that the return conductors are not shown. Additionally, the elements designated SW are sound transducers which can be used both as a microphone and as a speaker. The rectangular blocks designated by V, followed by number are one-way amplifiers which are of a type well-known in the art. The talking buttons or switches associated with each subset is designated by the letter prefix S while the line connecting switches are designated by the letter prefix L. The first number of each reference character identifies the figure of drawings, the second letter identifies the associated station designation and the third number designates the associated station to which the concerned switch connects the calling station. The reference characters having the letter A, B, or C as a suffix operate simultaneously with the operation of the corresponding element having a single-letter reference character assigned thereto.

Referring now to FIG. 1 of the drawings, a description of the operation of the prior-art arrangement will be given.

Assuming the party at unit SW–11 desires to converse with the party at unit SW–13, switch S–11 and S–11A are operated by the calling station and unit SW–11 is thus connected to amplifier V–11. Thereafter, the calling station manually operates the line key or switch associated with the desired station. In this case, the subscriber at unit SW–11 operates switch L–113 to thereby connect the output of amplifier V–11 to the unit SW–13 through contacts S–13 and L–131. The calling party then signals the called party by announcing the name or code of the desired subscriber, which sound signals are carried over the signalling branch of the called circuit, namely through contacts of switch L–131 in its normal position, common point M–13, contacts on switch S–13 in its normal position and are reproduced by unit SW–13. At the same time, however, these calling signals are passed through contacts L–132 and L–123 to transducer SW–12 through the contacts S–12. In this way, both the transducers SW–12 and SW–13 at the called station are energized. Since the identity of the desired party is announced, only that party will answer by operating switch S–13, S–13A and L–131 to thereby connect amplifier V–13 in the communication circuit that extends from amplifier V–11 of the calling station through the communication circuit that extends from switch S–11A to switch L–113, through switch L–113 through switch L–131 to the communication circuit to transducer SW–13. The communication circuit is a circuit that extends from switch L–131 to switch S–13A. This communication circuit is used in both the transmitting and receiving of talking signals. The operation of switch L–131 does not disconnect the talking circuit of the called and called stations from the transducers associated with the other stations, since a metallic path is completed through switches L–112 and L–121 and through switches L–132 and L–123.

In the event the calling subscriber desires to speak with additional stations, the corresponding switch L–112 is operated at the calling station and the switch L–121 of the other desired station is likewise operated. In such an arrangement, a conference circuit is established.

From the foregoing, it can be seen that a simple and economical intercommunication system is provided but such system has the disadvantage that all stations are signalled on every call that is originated and all stations are included in the conversation circuit.

Figure 2:
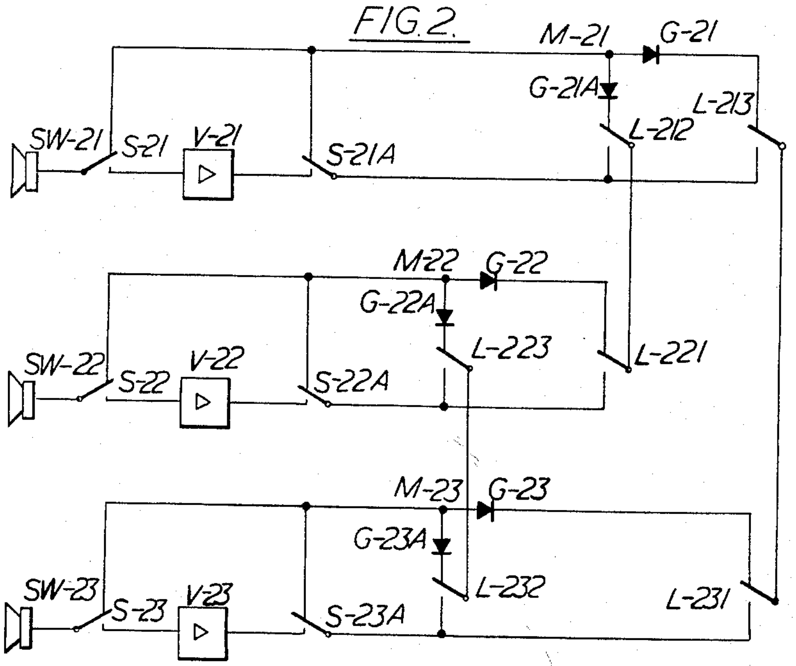
FIG. 2 shows the prior-art arrangement of FIG. 1 modified by the insertion of uni-directional devices in the signalling path.

Referring now to FIG. 2 of the drawings, the described system of FIG. 1 is modified to overcome the noted signalling and non-secrecy disadvantages.

When the calling station of FIG. 1 signalled the called station, the speech signals constituting the calling signal appeared at the common point M–13 and from there was extended to transducers SW–12 and SW–13. In FIG. 2 of the drawings, uni-directional devices G–21 and G–21A are inserted in the speech path of the station containing transducer SW–21 and rectifiers G–22, G–22A, G–23, and G–23A are provided for the transducers SW–22 and SW–23. The function of these devices or rectifiers in providing selective signalling and secrecy of conversation will now be described.

When the calling station associated with transducer SW–21 desires to call the station associated with transducer SW–23, switches S–21, S–21A and L–213 are operated. The calling signal is then transmitted through amplifier V–21, switches S–21A, L–213, and L–231 to rectifier G–23. The amplitude of such signal is sufficient to overcome the forward resistance of rectifier G–23 thereby permitting transducer SW–23 to reproduce the calling signal. The common point M–23 is isolated from the equipment associated with the other calling stations by a rectifier G–23A which is oppositely poled to the incoming signals. This rectifier, in addition to the oppositely poled rectifier G–22A of the station associated with transducer SW–22 completely isolates the non-calling stations from receiving the noted signals. In a similar manner, the speech signals from the called station pass through switch L–213 and are precluded from reaching the transducer SW–22 by rectifier G–21A and G–22 being oppositely poled. Thus, a calling station may signal a called station to the exclusion of all other stations of the system and the conversation is precluded from being overheard.

In order to overcome the forward resistance of rectifier G–23 when the transducer SW–23 is being signalled, the output of amplifier V–21 is of the level greater than normally required in intercommunication systems. This increased amplitude has a disadvantage that cross-talk may appear on the interconnecting wires and pass through rectifier G–22 to thereby activate transducer SW–22. This may be overcome by reducing the gain of the amplifier, but this results in a corresponding loss in signal strength of the calling signal. Thus, a simple and economical intercommunication system is provided which provides selective calling and privacy of conversation but one which is subject to cross-talk influences.

Figure 3:
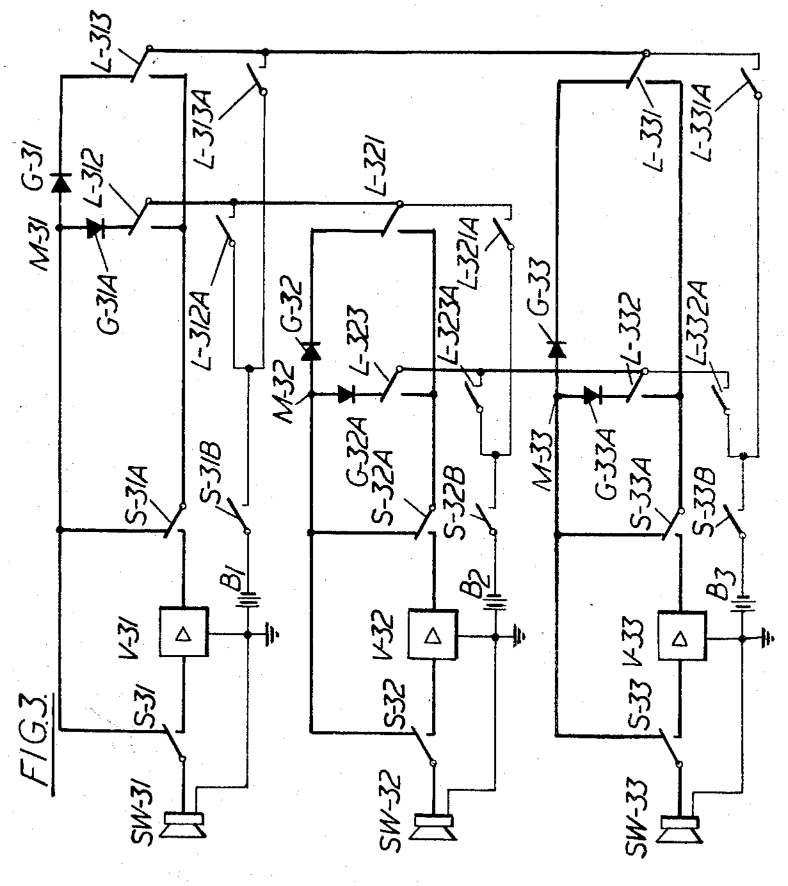
FIG. 3 shows a further modification of the arrangement of FIG. 2 in which a biasing arrangement is provided for controlling the blocking characteristics of the noted uni-directional devices.

Referring now to FIG. 3 of the drawings, the noted cross-talk influences can be substantially eliminated by biasing the rectifier C–33 to effectively reduce its forward resistance. As a result thereof, the amplitude of the signals from amplifier V–31 may be reduced. This reduction in amplifier gain reduces the cross-talk signals appearing at rectifier G–32. Since the forward resistance of rectifier G–32 is uneffected by the biasing, the forward resistance is sufficient to completely eliminate the reduced cross-talk signals.

The operation of FIG. 3 in providing the noted biasing will be described.

When the switch S–31 is operated, switches S–31A and S–31B are similarly operated. Likewise, operation of the line contacts L–313 results in the operation of the line contacts L–313A. Switches S–31B and L–313A extend a negative battery potential from battery B1 through contacts L–331 to one pole of rectifier G–33. This potential effectively reduces the forward resistance of rectifier G–33 to permit the voice signals from the calling station to readily pass therethrough at a low amplitude. Since this biasing potential is not supplied to rectifier G–32, cross-talk is effectively eliminated therethrough.

Figure 4:
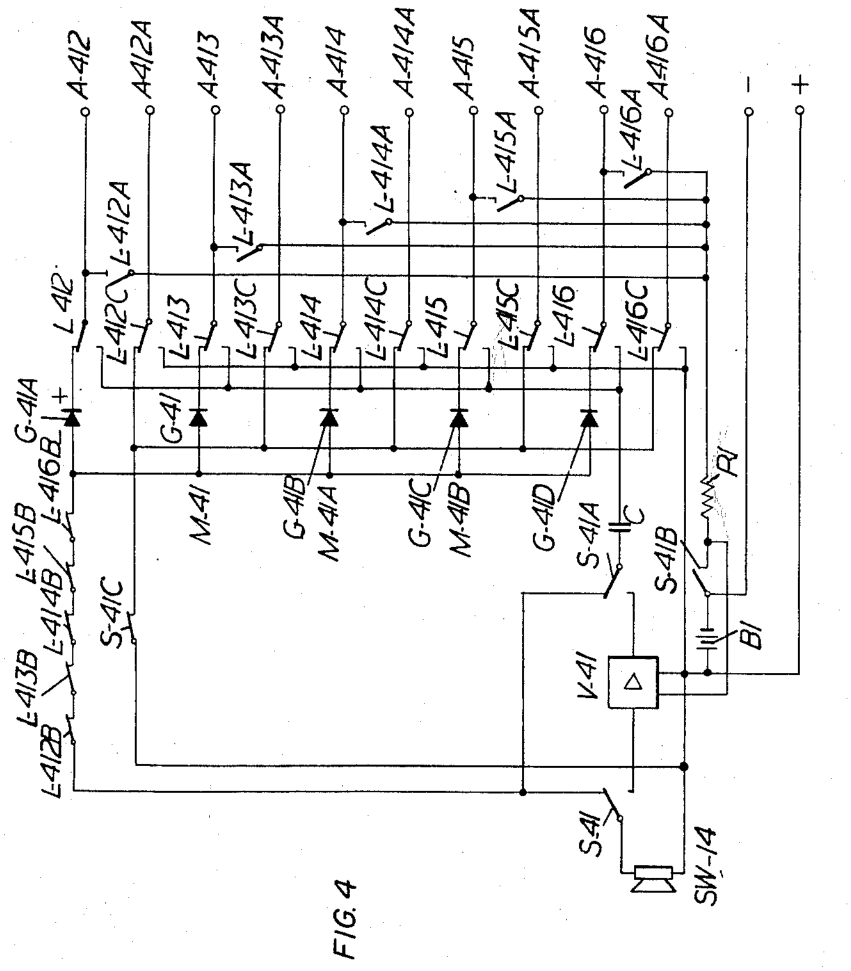
FIG. 4 shows a circuit arrangement of one station in a system of six stations.

FIG. 4 shows a circuit arrangement of the station associated with transducer SW–41 in a system of six stations of the same authorization. Resistor R–1 serves for the limiting of the current and for the setting of the operating point of the rectifier to be opened. Resistor R–1 must be dimensioned small with the respect to the loading of the amplifier of the calling station for voice frequencies. This resistor may be an ohmic or inductive with an ohmic component.

Capacitor C is provided to block the direct current potential after operation of any of the line switches L–412C to L–416C in switching over from the signalling circuit to the conversation circuit.

From the foregoing it can be seen that a simple and economical intercommunication system is provided which permits selectively signalling, secrecy of conversation and substantially no cross-talk.

It is to be understood that the foregoing description of specific examples of this invention is not to be considered a limitation on scope.

We claim:

1. An intercommunication system serving a plurality of stations, line means associated with each of said stations, each of said line means comprising a signalling branch and a communication branch, a plurality of line switch means at each of said stations normally providing individual connections from the signalling branch of each of said line means to the signalling branches of all of the others of said line means through corresponding ones of said line switch means, means responsive to the operation of selected ones of said line switch means at a calling one of said stations for selecting called stations by individually or simultaneously transferring any of said connections from the signalling branch of said line associated with said calling station to the communication branch of said line associated with said calling station to connect the last said communication branch to the signalling branch of the line means associated with the selected called station through said corresponding line switch means, means for transmitting a call signal over the communication branch of the line means associated with the calling station to the signalling branch of the selected line means and uni-direction blocking means connected between the signalling branch and each of the line switch means for preventing the signals from being transmitted from the signalling branch of the said selected line means to the signalling branch of the non-selected line means normally connected thereto.

2. In the intercommunication system of claim 1 and means responsive to the operation of said corresponding line switch at said selected called station for transferring said connection at the line means associated with said called station from the signalling branch to the communication branch to establish a communication path from said calling station to said called station.

3. An intercommunication system as set forth in claim 2 and means for selectively biasing the said uni-directional blocking means to reduce cross-talk.

4. An intercommunication system as set forth in claim 3 comprising amplifier means in each of said communication branches and bias blocking means connected between said amplifier and said bias means for isolating said amplifier from said bias.

References Cited by the Examiner

UNITED STATES PATENTS

| | | | |
|---|---|---|---|
| 2,186,242 | 1/40 | Halligan | 179—39 |
| 2,221,652 | 11/40 | Pfleiderer et al. | 179—1 |
| 2,543,986 | 3/51 | Prahm | 179—18 |
| 2,852,612 | 9/58 | Baker et al. | 179—18 |
| 2,958,730 | 11/60 | Myers | 179—1 |

ROBERT H. ROSE, *Primary Examiner.*

THOMAS B. HABECKER, *Examiner.*